United States Statutory Invention Registration [19]

[11] Reg. Number: H79

Bartholet et al. [45] Published: Jul. 1, 1986

[54] MAGNETIC RECORDING DISK CARTRIDGE

[76] Inventors: Michael A. Bartholet, 900C W. Moorhead Cr., Boulder, Colo. 80303; Marvin E. Prahl, 6635 Cherokee Ct., Longmont, Colo. 80501

[21] Appl. No.: 497,322

[22] Filed: May 23, 1983

[51] Int. Cl.[4] ..... G11B 23/02
[52] U.S. Cl. ..... 360/133; 360/99
[58] Field of Search ..... 360/97–99, 360/133, 86, 128, 137; 206/444

[56] References Cited

U.S. PATENT DOCUMENTS

| | | | |
|---|---|---|---|
| 3,416,150 | 12/1968 | Lindberg, Jr. | 340/174.1 |
| 3,845,502 | 10/1974 | Paus | 360/86 |
| 3,932,895 | 1/1976 | Ward | 360/135 |
| 4,159,494 | 6/1979 | Evans et al. | 360/133 |
| 4,315,289 | 2/1982 | Holecek et al. | 360/99 |
| 4,352,132 | 9/1982 | Gyi | 360/133 |
| 4,482,929 | 11/1984 | Beck et al. | 360/128 |

*Primary Examiner*—Stephen C. Buczinski
*Assistant Examiner*—Linda J. Wallace

[57] ABSTRACT

A square hard-cartridge diskette, housing a two-sided floppy disk, is constructed and arranged to be symmetrical about a diagonal axis, such that the diskette is oriented for use of one disk side, or the other, by rotating the cartridge 180° about this diagonal axis. The diskette carries locating notches and polarizing edges which operate, respectively, to properly locate the diskette within a using disk drive, and to prevent improper insertion of the diskette into the disk drive. The locating notches and polarizing edges are located symmetrically relative this diagonal axis. Head-access openings and disk cleaning members are located on this diagonal axis.

18 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC RECORDING DISK CARTRIDGE

TECHNICAL FIELD

This invention relates to the field of dynamic magnetic information storage or retrieval, and more specifically to a disk cartridge comprising a rigid plastic jacket which houses and protects a flexible magnetic recording (floppy) disk.

BACKGROUND OF THE INVENTION

The use of a floppy disk as rotating magnetic recording media is well known. More specifically, a single disk is permanently encased in a protective jacket. The disk rotates within the jacket, as the jacket is held stationary within a disk drive.

The present invention is an improvement upon copending and commonly assigned U.S. Patent application Ser. No. 391,060, filed June 22, 1982 now U.S. Pat. No. 4,482,929, incorporated herein by reference. More specifically, the present invention provides reversible or two-sided use of this copending application's cartridge.

Reversibility of a floppy disk cartridge, to thereby enable read/write of a selected side of the disk, has been addressed in the prior art.

U.S. Pat. No. 3,932,895 shows a square, flexible-jacket diskette having optical-detector holes which are offset symmetrically to opposite sides of a jacket axis along which the jacket's head access openings are placed. Thus, when the jacket is flipped 180° about this axis, the other side's head access opening and the other side's detector hole is properly positioned in the disk drive. In this arrangement, the head access openings run perpendicular to an edge of the cartridge. In one embodimment, the jacket's leading edge (the edge which first enters the disk drive) includes two write-enable cutouts. In this way, one of the cutouts is always in the correct position, for either flipped positions of the diskette.

The prior art also teaches single-sided diskettes having a head access opening located along a diagonal axis (i.e. an axis connecting the diskette corners) of a square diskette. U.S. Pat. Nos. 3,416,150 and 3,845,502 are exemplary. Both of these patents teach positioning or locating openings formed in the diskette. In patent '502 the locating openings are formed at the two trailing corners of the diskette; whereas, in patent '150 the locating openings are formed along the diagonal axis which includes the head access opening. In both patents, the diskette includes a rigid jacket.

Aforesaid copending and commonly-assigned U.S. Patent Application Ser. No. 391,060 discloses a square, single-sided, rigid-jacket diskette having a head access opening located along a diagonal axis. The jacket's leading edge includes locating openings or notches at the two leading corners of the diskette. A movable, rigid cleaning pad is provided on one side of the jacket. This pad lies along the aforesaid diagonal axis, but it is located adjacent the corner of the jacket opposite the head access opening. One leading corner includes a polarizing taper which insures that the diskette can be inserted into the drive in only one position; for example, the taper must be located at the left corner of the diskette's leading edge, as the diskette is held in a horizontal plane.

SUMMARY OF THE INVENTION

The present invention provides an improvement of the aforesaid copending application by a construction and arrangement whereby the disk within the diskette cartridge or housing is a two-sided disk; and the housing includes two oppositely-aligned head access openings, and two oppositely-aligned disk cleaning members; thus doubling the data which is contained on the disk.

More specifically, the diskette of the present invention is contructed and arranged to be symmetrical about a diagonal axis of the diskette; and specifically, about the diagonal axis on which the diskette's head access opening and cleaning member are located.

Thus, the diskette of this invention can be oriented for use of a selected side of the disk merely by rotating the diskette 180° about this diagonal axis (axis 60 of FIG. 1).

A further feature of the present invention provides diskette insertion indicia (arrows 14 and 114 of FIG. 1), one of which is located on each side of the diskette. These arrows are located at 90°, to thereby point in the proper direction only when the diskette has been properly rotated, as the user changes from using one side to using the other side of the disk.

The two edges of the diskette which meet at the 90° corner adjacent the head access opening (corner 225 of FIG. 1) also carry diskette locating notches or recess pairs (25 and 125 of FIG. 1) which operate to properly locate the diskette within a disk drive.

The two opposite corners of the diskette which lie on the diskette's orthogonal axis (160 of FIG. 1) carry polarizing means, in the form of tapered edges (11 and 111), which operate to prevent the diskette from being inserted into the disk drive in other than one of its two rotated attitudes.

These two opposite corners also carry locating notches (26 and 126) which are selectively operable as the diskette is rotated for use of one side or the other of the disk.

The foregoing and other features and advantages of the invention will be apparent from the following more particular description of a preferred embodiment of the invention, as illustrated in the accompanying drawing.

DESCRIPTION OF THE PREFERRED EMBODIMENT

Figure 1:
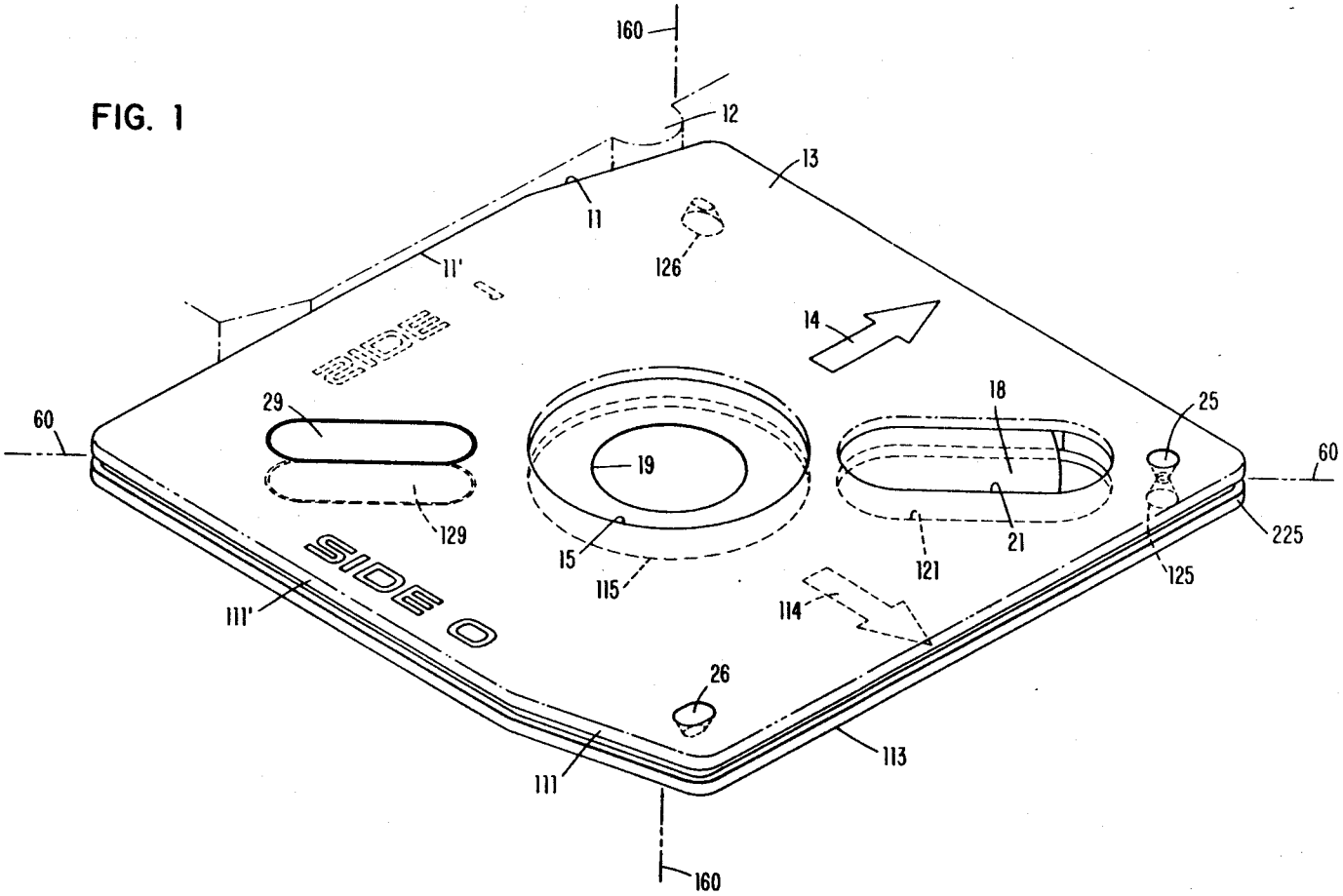
FIG. 1 is a top view of the rigid magnetic recording disk cartridge of the present invention, with "side 0" oriented for use.

The rigid magnetic recording disk cartridge (diskette) of the present invention includes a rigid plastic envelope, preferably formed of an opaque polycarbonate. The cartridge is about 0.5 cm thick and 10 cm square. A top view is seen in FIG. 1, although the designation top and bottom are arbitrary since the cartridge can be used with its flat plane oriented in any direction.

Figure 2:
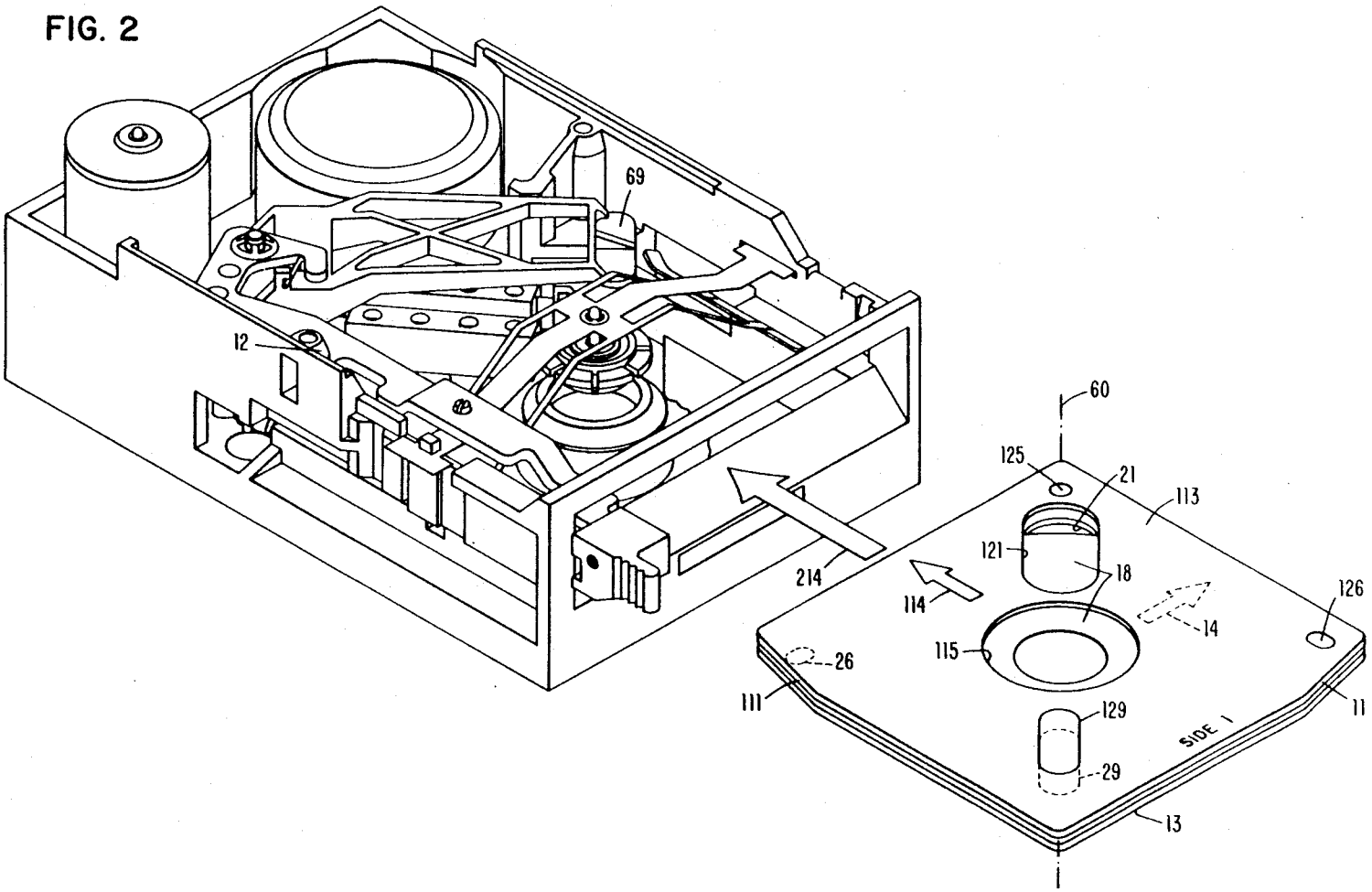
FIG. 2 shows FIG. 1's cartridge prior to insertion in an exemplary flexible disk drive, after the cartridge has been rotated 180° about rotation axis 60, to thus present "side 1" for use.

Cartridge 10 is essentially square, with the exception of tapered boundary edges 11 and 111. Edges 11 and 111 are tapered at about 15° to sides 11' and 111' of the cartridge. These two tapered edges are constructed and arranged to cooperate with a stationary wall portion 12 of the disk drive (FIG. 2) with which the cartridge is used. Edges 11 and 111, and wall portion 12, cooperate so that the cartridge cannot be incorrectly inserted in the drive, as the cartridge is manually inserted in direction 214 (FIG. 2). The two opposite corners of the diskette which lie on the diskette's orthogonal axis 160 carry polarizing means, in the form of tapered edges 11 and 111, which operate to prevent the diskette from being inserted into the disk drive in other than one of its two rotated attitudes. Arrow 14 is visible indicia carried by the cartridge. The underside of the cartridge carries similar indicia 114. Both indicia visually indicate the direction of cartridge insertion, when the cartridge is rotated 180° about its diagonal rotation axis 60.

Each wall 13, 113 of the cartridge also includes a usage-indicia label—"side 0" and "side 1", respectively. Each of these indicia is paired with one of the insertion indicia 14, 114. That is, when the user wishes to use "side 0", the cartridge is flipped (about axis 60) such that indicia 14 indicates the direction of insertion (214 of FIG. 2) into the disk drive. Conversely, when "side 1" is to be used, indicia 114 is operable to indicate the direction of insertion, as shown in FIG. 2. Whatever sise is in use, only the usage indicia ("side 1" of FIG. 2) associated with the operative insertion indicia (114 of FIG. 2) is viewable by the operator, once the cartridge has been fully inserted into the disk drive.

Each of the cartridge's flat, parallel walls 13 and 113 carries locating means in the form of notch pairs 25, 26 and 125, 126. These notches operate to properly locate the cartridge within the disk drive of FIG. 2. When the cartridge is oriented as shown in FIG. 1, pair 125, 126 is operative. When the cartridge is oriented as shown in FIG. 2, pair 25, 26 is operative. Each pair of notches includes a cone shaped notch 25, 125, whose apexes are oppositely aligned. As an alternative, the apexes of notches 25 and 125, may be symmetrically offset on opposite sides of axis 60, such that they occupy and exchange the same location in space, as the cartridge is rotated 180° about axis 60. These notches are located on rotation axis 60, at a first corner 225 of the cartridge.

Notches 26 and 126 are located in walls 13 and 113, repectively. Each of these notches comprises an elongated tapered recess whose axes of elongation, when extended, cross near corner 225. More specifically, these axes of elongation cross at the apex of cones 25, 125. In the aforesaid alternative construction (i.e., when the apexes of notches 25 and 125 are not aligned), the axis of elongation of notch 126 crosses the apex of notch 125, and the axis of elongation of notch 26 crosses the apex of notch 25. Each of the tapered recesses 26, 126 is located approximately on the cartridge's orthogonal axis 160, adjacent polarizing means or tapered edges 111 and 11, respectively.

The disk drive of FIG. 2 includes two stationary, tapered pins which mate with cartridge notches 125, 126 (when cartridge "side 0" is to be used by the disk drive). Elongation of notch 126 allows sidewise movement of the cartridge, along the axis of elongation of notch 126, as a disk-drive-pin seats in notch 125.

The cartridge's flat top wall 13 and flat bottom wall 113 both include centrally located, circular, oppositely-aligned apertures 15, 115. These two apertures receive the disk drive's stationary but rotatable spindle and movable collet. A flexible magnetic recording disk 18 of the well known "floppy" type is loosely captured within the cartridge's inner cavity. This disk is of thin, flexible magnetic recording media, and includes a central, circular, mounting aperture 19 whose peripheral boundary is clamped to the disk drive's collet/spindle mechanism. When so clamped, the disk's circular data tracks are concentric with the central axis of aligned apertures 15, 115; and the disk spins about this axis, as the disk assumes a flat spin-plane perpendicular to this axis, and parallel to the two sides 13, 113 of the cartridge housing.

The cartridge's two opposing walls 13 and 113 include oppositely-aligned, elongated openings or head-access slots 21 and 121, respectively, which are located on the aforesaid diagonal axis 60. These slots enable the disk drive's magnetic head to obtain access to one side (FIG. 1) or the other side (FIG. 2) of the disk. As seen in FIG. 2, a felt-like pressure pad 69 enters the unused one of apertures 21, 121, as the head enters the used one of these two apertures. In this way, the spinning disk is trapped between the disk drive's pad and head. Head backup pad 69 spans substantially the entire disk-radial distance of unused aperture 21, 121. The opposing head incrementally moves on the disk-radius of the used aperture 21, 121, as the pad remains stationary. This head/pad arrangement is described in U.S. Pat. No. 4,315,289, incorporated herein by reference.

Pad 69 wipes the magnetic recording side of disk 18 which is currently not in use. Therefore, this pad must be made of a material which does not abrade or contaminate the disk's magnetic recording layer. A pad material such as felt is preferred.

The cartridge's two opposing walls 13 and 113 also include oppositely-aligned, movable, rigid housing pieces 29 abd 129 which operate to clean the disk's two recording surfaces. These cleaning members are located on digaonal axis 60. More specifically, a movable push-rod, contained within the disk drive of FIG. 2, operates to push upward on member 129 when the cartridge is oriented as shown in FIG. 1, and to push upward on member 29 when the cartridge is oriented as shown in FIG. 2. As stated in the aforesaid copending application, this cartridge includes internal cleaning means in the form of a wiping cloth liner.

The disk drive of FIG. 2 is more completely disclosed in copending and commonly assigned U.S. patent application Ser. No. 391,050, filed June 22, 1982, now U.S. Pat. No. 4,509,086, incorporated herein by reference. Cartridge slots 21 and 121 are about 1.5 cm wide and 3 cm long.

Figure 3:
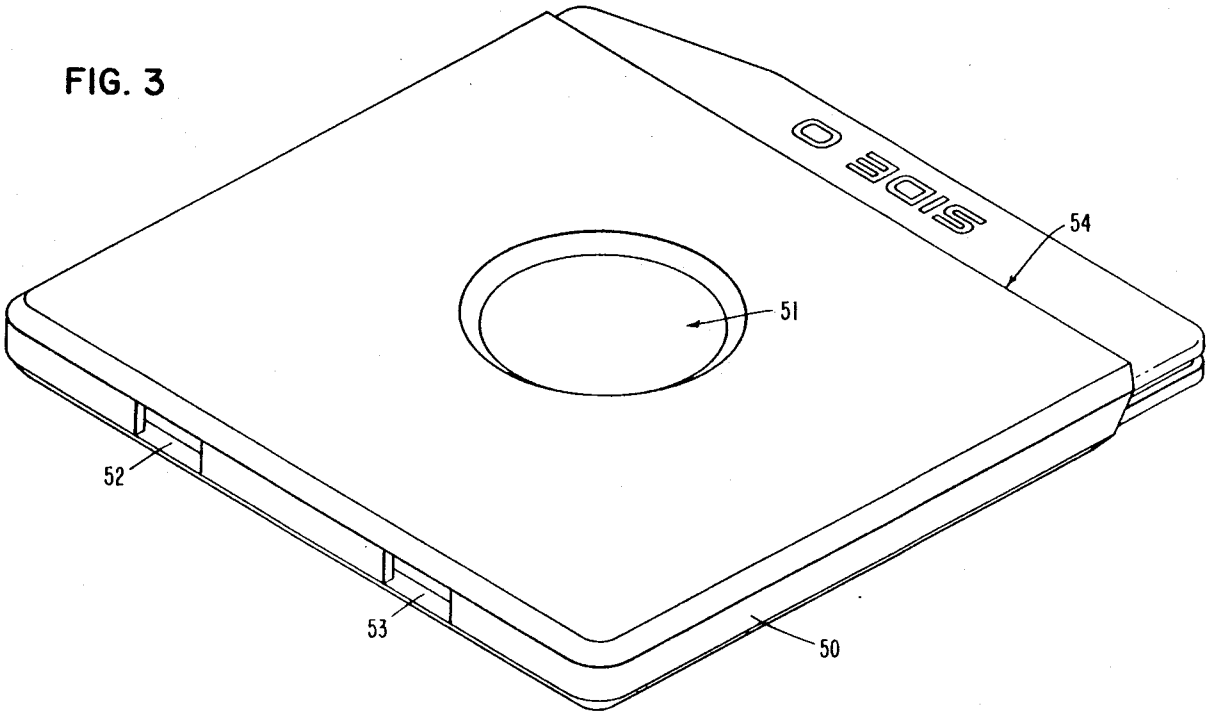
FIG. 3 shows the cartridge of the present invention contained within a protective sleeve, ready for storage.

FIG. 3 shows the diskette ready for storage. As such, it has been inserted into an envelope or pouch 50 which is formed (blow molded) of a somewhat resilient plastic such as polyethylene. In this condition, disk 18 is totally enclosed and protected from physical contact, dust and the like. Pouch 50 includes a disk-shaped recess 51 which snaps into the opening 15 (or 115) of the diskette, thereby securing the diskette within the pouch. A pair of openings 52 and 53 allow air to evacuate out of the bottom of the pouch as the diskette is inserted into pouch opening 54.

While the invention has been particularly shown and described with reference to a preferred embodiment thereof, it will be understood by those skilled in the art that various changes in form and details may be made therein without departing from the spirit and scope of the invention.

What is claimed is:

1. A diskette, adapted for use with a disk drive having head means which operates on one or the other, but not simultaneously on both sides of a double-sided floppy disk which is enclosed within a thin, flat, generally square housing having four corners, said housing having a diagonal axis which crosses first and second opposite corners of said housing, and having an orthogonal axis which is perpendicular to said diagonal axis and crosses third and fourth opposite corners of said housing, the housing and its internal disk constituting said diskette; said diskette including:

a pair of elongated and oppositely-aligned head-access openings, one on each flat surface of said housing; said head-access openings being located on said diagonal axis adjacent said first corner, and being spaced to one side of a centrally located disk-drive opening;

two-pair of diskette locating means, one pair for each flat surface of said housing, first ones of each of said pair being symmetrically-aligned on said diagonal axis adjacent said first corner, second ones of each of said pair being symmetrically located on said orthogonal axis adjacent said third and fourth corners, and on opposite flat surfaces of said housing;

a first and second polarizing means carried by said housing, one at each of said third and fourth corners;

whereby the disk may be oriented for use of one side or the other by rotating said housing 180° about said diagonal axis;

such that said first and second corners of said housing occupy the same position within a disk drive for each of the two rotated positions of said housing, and different ones of said third and fourth corners occupy an operative position within the disk drive, for each of said two rotated positions.

2. The diskette of claim 1 including a pair of oppositely-aligned movable housing members, one in each flat surface of said housing; said movable housing members being located on said diagonal axis adjacent said second corner, said movable housing members cooperating with disk cleaning means contained within said diskette.

3. The diskette of claim 2 wherein said polarizing means comprise two tapered edges of said housing, said tapered edges being located symmetrical relative said diagonal axis.

4. The diskette of claim 3 wherein said locating means comprise recesses formed in each of said flat surfaces.

5. The diskette of claim 3 wherein said first ones of each of said pair of locating means comprise cone-shaped recesses; and wherein said second ones of each of said pair of locating means comprise elongated tapered recesses whose axis of elongation, when extended, cross adjacent said first corner of said housing.

6. The diskette of claim 3 wherein the extended axis of elongation of each of said second ones of said pair of locating means crosses the apex of its mating-side cone-shaped recess.

7. The diskette of claim 5 wherein said first ones of said pair of locating means are oppositely aligned and are located on said diagonal axis, and wherein the extension of said axis of elongation crosses at the common apex of said cone-shaped recesses.

8. The diskette of claim 7 wherein said housing is formed of rigid plastic, and is about 10 cm square and about 0.05 cm thick.

9. The diskette of claim 5 wherein said housing is formed of rigid plastic, and is about 10 cm square and about 0.05 cm thick.

10. The diskette of claim 8 wherein said two tapered edges form an acute angle of about 15° to the two edges of said housing which meet to form a 90° corner at said second corner.

11. The diskette of claim 9 wherein said two tapered edges form an acute angle of about 15° to the two edges of said housing which meet to form a 90° corner at said second corner.

12. The diskette of claim 3 wherein said two tapered edges form an acute angle of about 15° to the two edges of said housing which meet to form a 90° corner at said second corner.

13. The diskette of the claim 10 wherein each of said two flat surfaces of said housing includes indicia indicating proper direction of insertion into the disk drive, said indicia being oriented at 90° to each other and being directed toward the two edges of said housing which meet to form a 90° corner at said first corner of said housing.

14. The diskette of claim 11 wherein each of said two flat surfaces of said housing include incidia indicating proper direction of insertion into the disk drive, said indicia being oriented at 90° to each other and being directed toward the two edges of said housing which meet to form a 90° corner at said first corner of said housing.

15. The diskette of claim 12 wherein each of said two flat surfaces of said housing include indicia indicating proper direction of insertion into the disk drive, said indicia being oriented at 90° to each other and being directed toward the two edges of said housing which meet to form a 90° corner at said first corner of said housing.

16. The diskette of claim 13 wherein each of said two flat surfaces includes indicia indicating side of usage, said usage indicia being oriented at 90° to each other and being located on the opposite edge of said housing from its mating insertion indicia.

17. The diskette of claim 14 wherein each of said two flat surfaces includes indicia indicating side of usage, said usage indicia being oriented at 90° to each other and being located on the opposite edge of said housing from its mating insertion indicia.

18. The diskette of claim 15 wherein each of said two flat surfaces includes indicia indicating side of usage, said usage indicia being oriented at 90° to each other and being located on the opposite edge of said housing from its mating insertion indicia.

* * * * *